Dec. 15, 1936.     F. R. NEELY     2,064,488
COMPOSITE BOX AND MANUFACTURE THEREOF
Original Filed Aug. 15, 1931     8 Sheets—Sheet 1
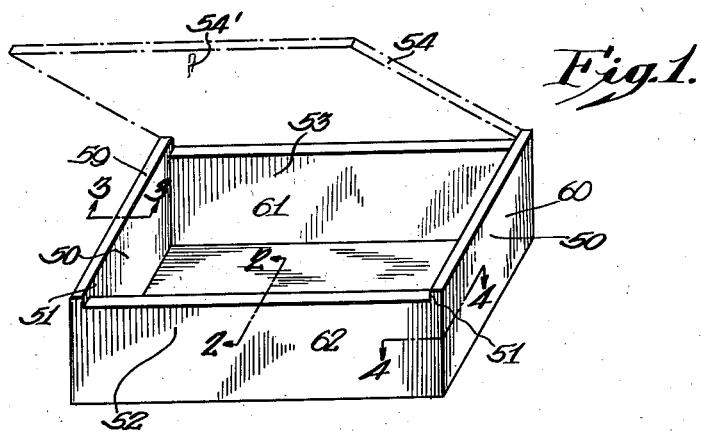
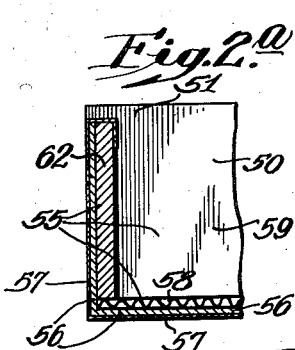 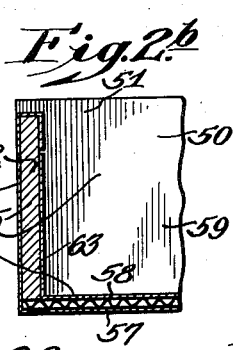 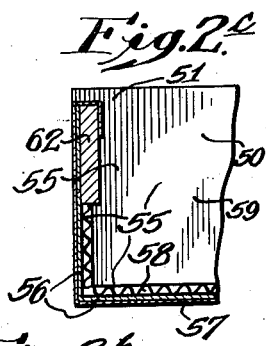
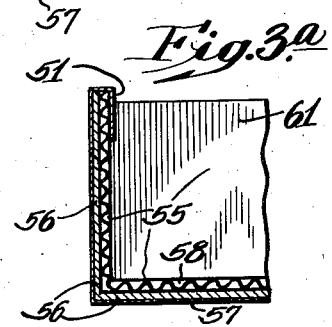 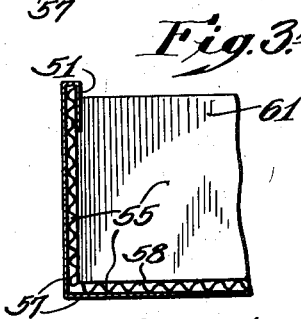
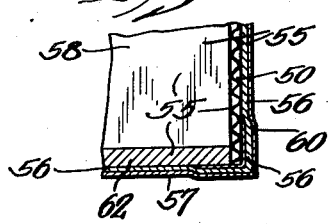 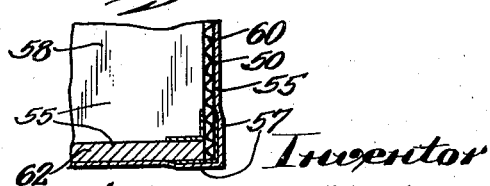

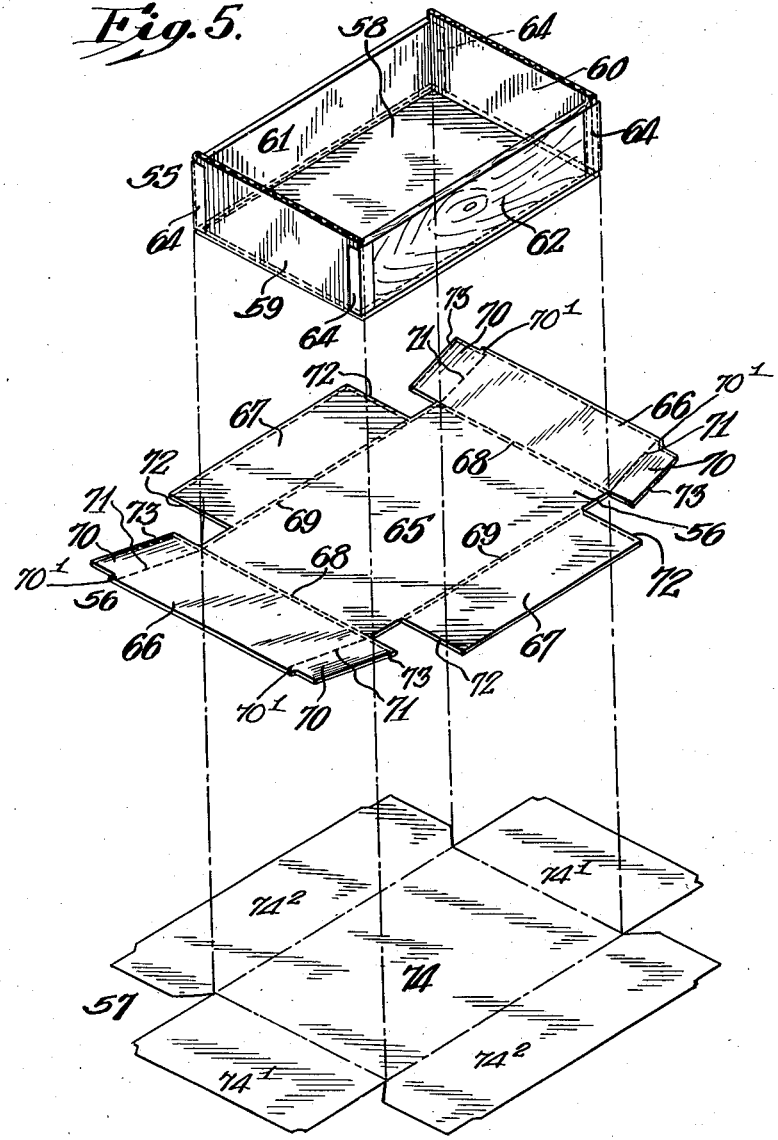

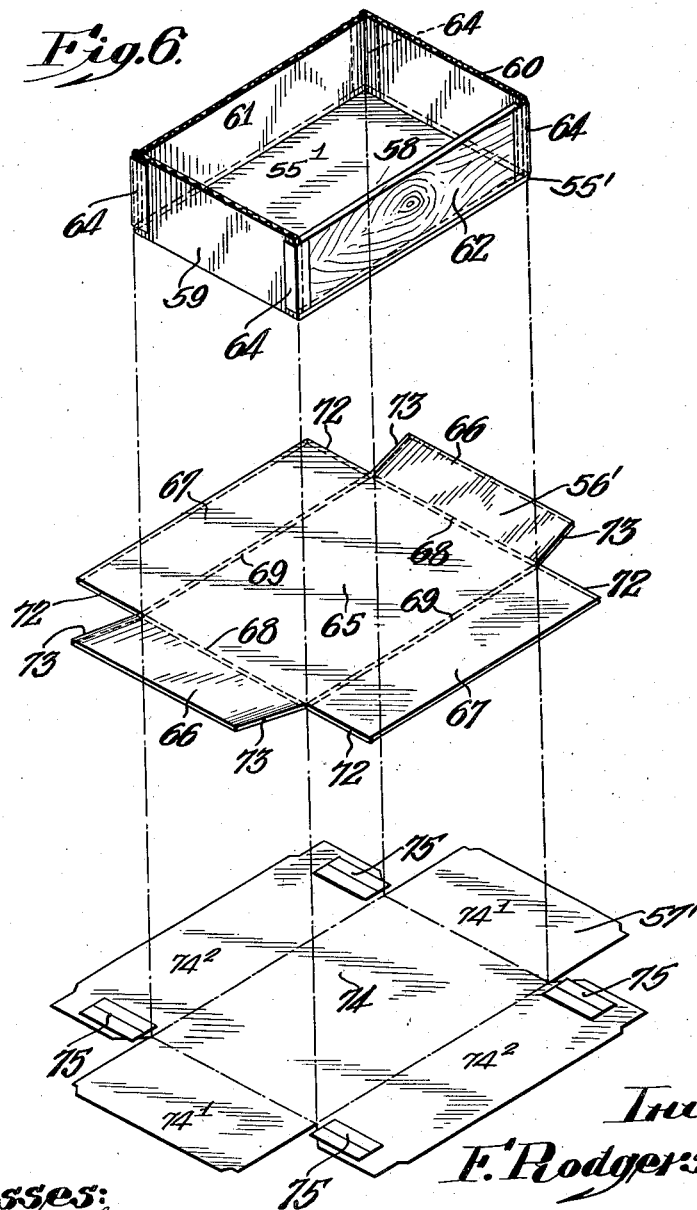

Dec. 15, 1936.  F. R. NEELY  2,064,488
COMPOSITE BOX AND MANUFACTURE THEREOF
Original Filed Aug. 15, 1931   8 Sheets-Sheet 4
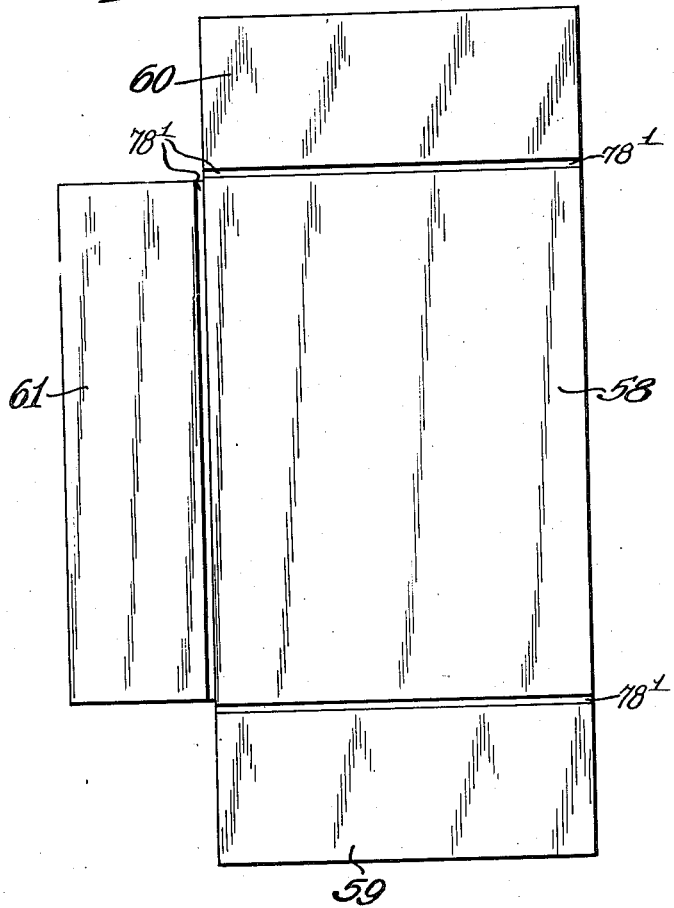
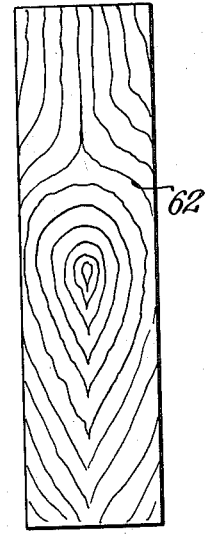
Witnesses:
Inventor
F. Rodgers Neely
by Attorneys.

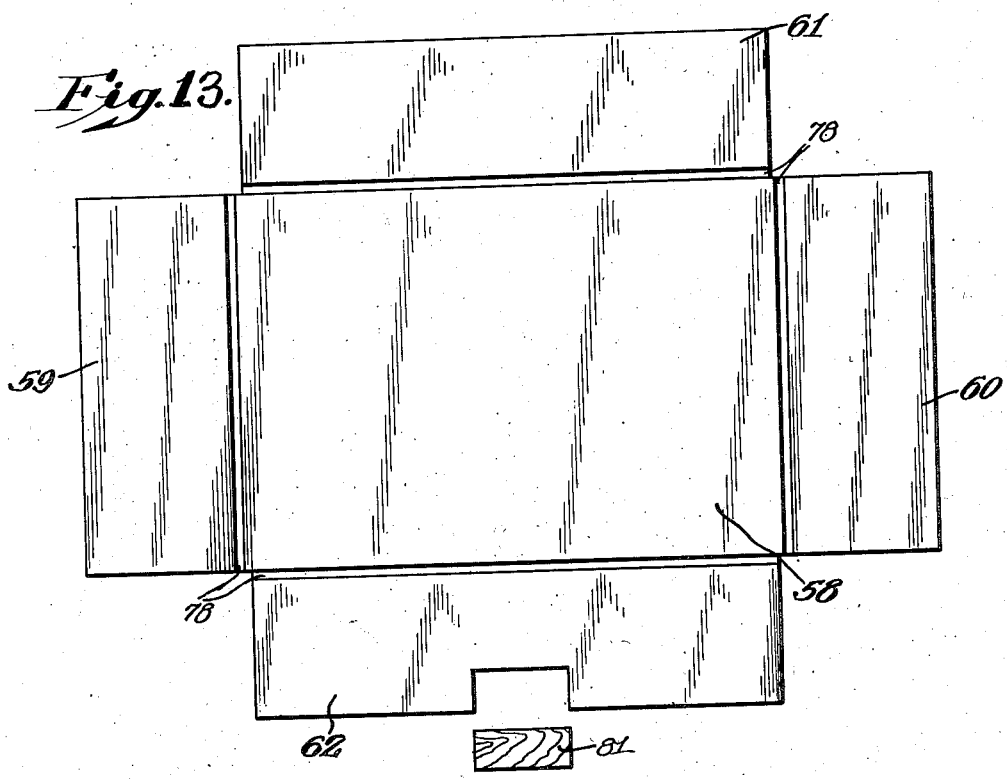
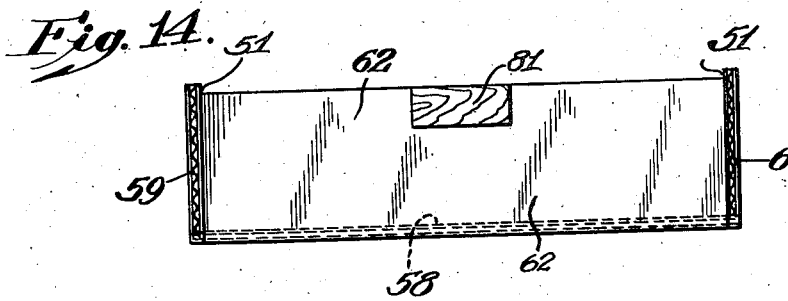

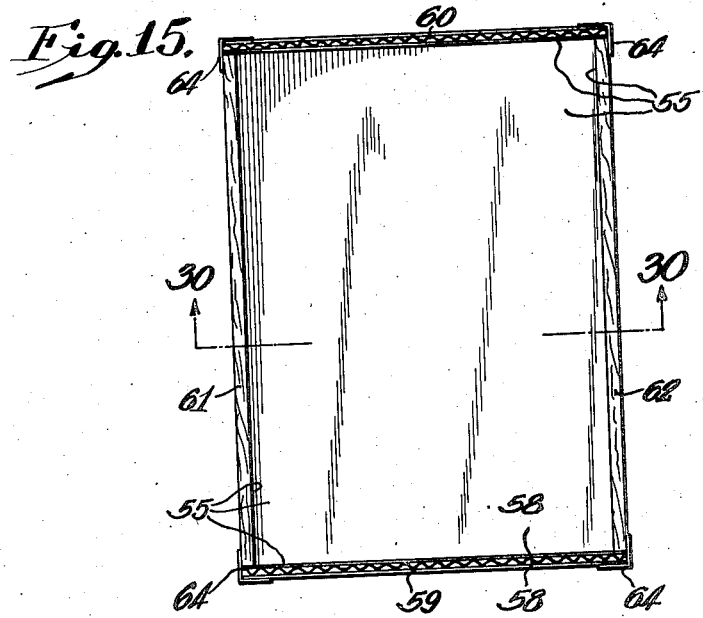
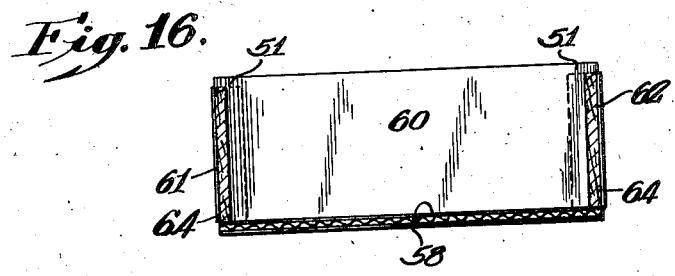

Dec. 15, 1936.  F. R. NEELY  2,064,488
COMPOSITE BOX AND MANUFACTURE THEREOF
Original Filed Aug. 15, 1931   8 Sheets-Sheet 8
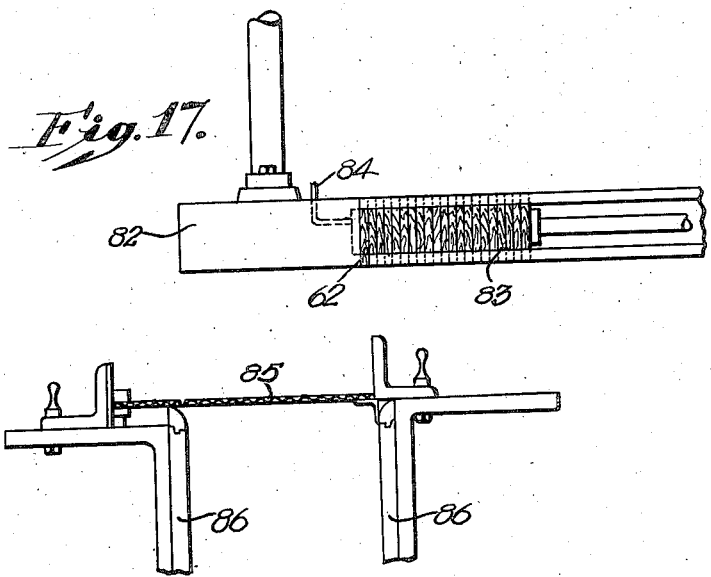
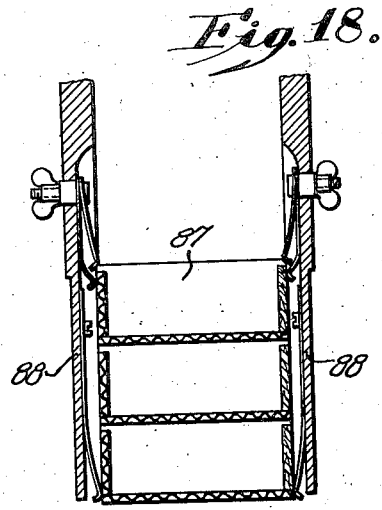

Patented Dec. 15, 1936

2,064,488

UNITED STATES PATENT OFFICE 2,064,488

COMPOSITE BOX AND MANUFACTURE THEREOF

Frank Rodgers Neely, Allentown, Pa.

Original application August 15, 1931, Serial No. 557,340. Divided and this application September 19, 1933, Serial No. 690,115

2 Claims. (Cl. 93—43)

My invention relates to composite boxes and to the manufacture thereof, being a division of my copending application Serial No. 557,340, entitled "Composite box and manufacture thereof", filed August 15, 1931.

A purpose of my invention is to cheapen and lessen the weight of boxes of a type hitherto usually made of wood and in which the lids can be nailed down.

A further purpose is to make the ends and bottom and permissibly the back of a box of corrugated paper or the like and part or all of the front of the box and the back, if desired, of wood composition or the like.

A further purpose is to provide a desirable method of manufacturing an inner box using a suitably modified existing machine.

A further purpose is to form a composite box upon the bottom and sides of a movable form of size to fit the interior of the finished box and from a blank that is to include a bottom and one or more sides of the box and a cooperating blank to include another side of the box by registering the first blank beneath and the second blank upon one side of the stationary form and in concurrently holding the second blank to the form and moving the form between guides to sweep the side portions of the first blank to position against the corresponding side portions of the form.

Further purposes will appear in the specification and in the claims.

I have elected to show a few only of the many forms of my invention, selecting forms that are practical and efficient in operation and which well illustrate the principles involved.

Figure 1 is a perspective view showing finished box structure embodying my invention, the view being intended to represent equally well different alternative boxes of the invention variant with respect to detail construction.

Figures 2a, 2b and 2c are fragmentary detail sections taken in positions corresponding to that of line 2—2 of Figure 1 and showing alternative constructions.

Figures 3a and 3b are fragmentary detail sections taken in positions corresponding to that of line 3—3 of Figure 1 with the alternative constructions respectively of Figures 2a and 2b.

Figures 4a and 4b are fragmentary horizontal sections taken in positions corresponding to that of line 4—4 of Figure 1 with the alternative constructions respectively of Figures 2a and 2b.

Figure 5 is a perspective view comparing desirable forms of inner and outer shells and wrap of the box of Figures 1, 2a, 3a and 4a, preparatory to assembly for feeding to a box machine and in position for assembly.

Figure 6 is a view generally similar to Figure 5 but different with respect to detail members,— the outer shell and wrap.

Figures 7 to 10 are figures showing blanks for bottom, ends and back of a box.

Figure 11:
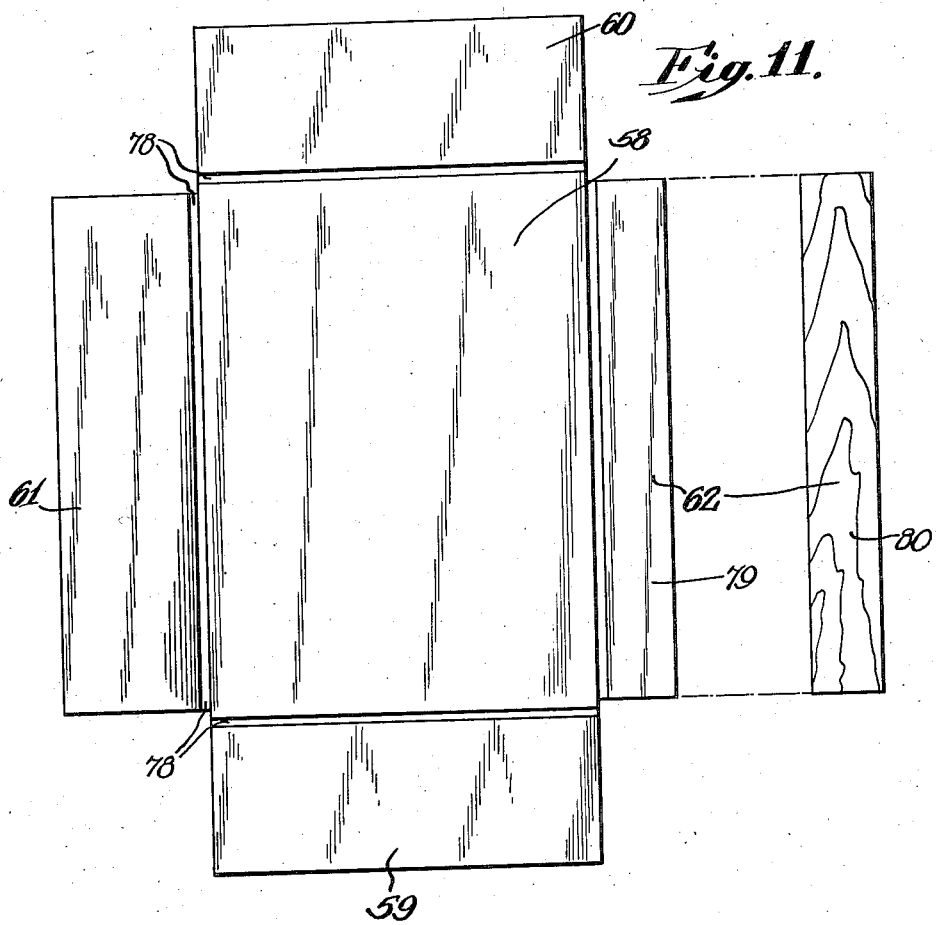

Figure 11 is a plan view of a somewhat different form of inner box blank including separated portions for assembly in the box machine.

Figure 12:
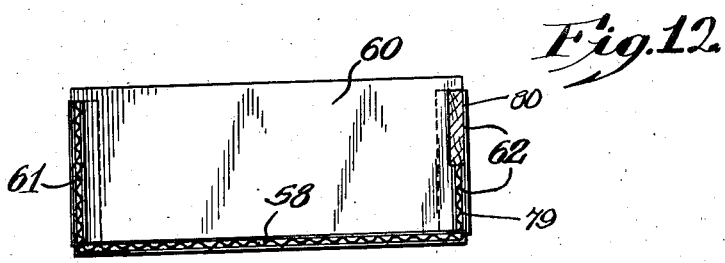

Figure 12 is a vertical section through the folded inner box made from the blank of Figure 11.

Figure 13 is a view corresponding generally to Figure 11 but showing a different form.

Figure 14 is a front elevation of the set-up box made from the form of Figure 13.

Figure 15 is a top plan view of an inner box, the view corresponding generally to Figure 13 but showing a somewhat different form.

Figure 16 is a vertical section taken upon the line 16—16 of Figure 15.

Figure 17 is a fragmentary view corresponding to a modified portion of Figure 2 of U. S. Patent 1,383,697 to C. C. Davis, showing blanks for an inner box in a box machine preparatory to assembly.

Figure 18 is a fragmentary section corresponding generally to Figure 3 of the above patent, showing a number of set-up boxes, with the bottom box ready for downward discharge.

Like numerals refer to like parts in all figures.

Describing in illustration and not in limitation and referring to the drawings:—

The present invention is directed to what might be called a substitute box in that it comprises a wrapped box of a type that has heretofore been usually made of wood or the like, optionally looking like the wooden boxes of the prior art, having drop lid ends and a front adapted to hold one or more nails from the lid so that the box lid may be nailed down; also permissibly a back of different materials from the bottom and ends. The front and back may be made of wood or composition of which one example is found in chestnut board.

Heretofore substitute boxes have been without provisions for permitting an effective nailing down of the lids and in many cases, particularly when the boxes were intended to be used for cigars, this has been a feature so disadvantageous as to prevent the boxes from being used for the intended purpose.

One of the wide applications for boxes of the present invention is thought to be for cigars or the like, with the boxes adapted to be closed, sealed and fastened shut by an inspector driving one or more nails at the forward edge of the lid downward into the front of the box.

Figure 1 shows a typical finished box of the present invention that is intended to have the outside appearance of a box of the prior art, for example that of a wooden cigar box.

The box ends 50 are higher at 51 than the front 60 and back box sides 52 and 53 and the lid 54, shown in dot-and-dash fits between the drop lid ends 51.

The box may comprise form A including inner and outer shells 55 and 56 and an outside wrap 57, as illustrated in Figures 2a, 3a and 4a, or form B including an inner shell 55 and outer wrap 57 omitting the outer shell 56, as in Figures 2b, 3b and 4b, or form C which is form A modified with respect to a detail that is illustrated in alternative forms in Figures 2a and 2c.

In both the A and B forms the inner shell (see Figures 5 and 6) comprises a bottom 58, ends 59 and 60 and permissibly a back 61 that are of corrugated board or the like, preferably integral portions of a single piece, and a front 62 adapted to receive and hold a nail 54' (Figure 1) from the outer edge of the lid 54. The box covered by the wrap 57 will usually receive an inner lining of which a fragment as shown at 63 in Figure 2b, such, for example, as is now applied to cigar boxes of the prior art but which I have not considered it necessary to show in more than this one figure.

Desirably the inner and outer shells are in registry or even with one another along their corresponding upper edges, each shell including drop lid ends at 51 suitably higher than the top edges of the long sides at front and back.

The inner shell, exclusive of any stays, thus desirably includes larger and smaller board portions of which the larger preferably comprises an inexpensive open texture composition board and the smaller one or more boards, one of sufficiently dense texture to adapt the upwardly presented edges to receive and hold one or more nails from the lid, and permissibly one capable of holding the lid.

The larger open texture board may usually include the bottom and ends of the inner shell, usually also, but not necessarily, the back of the shell and optionally also the shell front except at any part or parts thereof needing to receive and hold a nail or nails from the lid.

The smaller denser texture board includes an upwardly directed edge portion presented to the lid for nailing at any desired point or points thereof.

With boxes having a hinged lid the denser board may include the whole or a portion only of the shell front (Figures 2a, 2b, 2c, 11, 12, 13 and 14), or if preferred, the denser portion may also include the whole or a suitable portion of the shell back (Figures 15 and 16).

While an important feature of the invention is directed to means permitting an effective nailing down of the lid, it will be understood that other features of the invention are independent of whether or not the lid is to be fastened down by one or more nails and, if there is to be no nailing, the open structure board may include both the front and the back as well as the ends and bottom of the shell.

The open board comprising the larger portion of the inner shell is suitably corrugated board, which may be made wholly or partially of chip board, kraft liners, straw board, chestnut board or other pulp board, paper or composition, herein called conventionally corrugated board and the portion presented to the nail or nails of the lid or which holds the back may be suitably wood or any composition board material, artificial or natural, adapted to receive and hold nails, such material being herein called conventionally dense board.

It will be understood that while the lids of cigar boxes and the like adapted to be replaced by the substitute boxes of the present invention are in usual present practice wood, they may be of any suitable board, with or without wrapping.

Usually the inner box is made of board relatively thick as compared to the outer shell, the thinness of the outer shell insuring cleaner-cut outside corners along scored lines of the outer shell blank.

The outer shell is suitably made of chestnut board, kraft liners or jute liners, kraft liners being particularly suitable.

The composite box may be lined before or after assembly. While illustrated as for lining subsequent to assembly in any suitable or usual way, it will be understood the lining may be applied to the inside parts of the inner box blank preparatory to setting it up into a box, the dense board front being separately lined.

The assembly of the inner box with the outer shell and wrap to provide a composite box of the form A, Figures 1, 2a, 3a and 4a, is illustrated for one form of outer shell in Figure 5 and for another form of outer shell in Figure 6.

While in Figures 5 and 6 the inner box 55 is illustrated as externally stayed at the corners at 64 it should be understood that the showing of the inner box in these figures is intended for a conventional showing of any suitably set-up inner shell.

The blank 56 for the outer shell of Figure 5 is of novel cruciform, as best seen in Figure 5.

It includes a body 65 that makes the bottom of the outer shell, end flaps 66 and front and back flaps 67, with score lines 68 and 69 between the body and the end and side flaps respectively.

The end flaps 66 make the ends of the outer shell and also short portions of the adjacent sides, having side turn-in extensions 70 from score lines 71, and the long side flaps 67 may be preferably cut away at the ends to clear in set-up positions the turn-in extensions 70 of the end flaps.

The side turn-in extensions 70 of the end flaps when set up function as stays and the portions 70' of the turn-in extensions act as effective covers over the ends of the drop lid end portions of the inner box.

The side flaps 67 when set up preferably substantially fill the portion of the sides not covered by the side turn-in extensions of the end flaps, with end edges 72 and 73 respectively of the side flaps and end extensions therefore abutting one another.

Referring to Figure 5, a wrap 57, outer shell blank 56 and set-up inner shell 55 are illustrated as having been delivered one above another for easy registered assembly.

The wrap 57 may comprise any appropriate wrap of the prior art and may be delivered, glue-side up, from any glue machine.

The outer box blank 56 registered vertically above the wrap may be received from a stencil gluer, with the upper side stencil glued as along the edges and at intermediate strips.

The inner shell 55 comprises any type of box, preferably having a front 62 adapted to receive one or more nails from the lid and the remainder of the box is made of any inexpensive board, which may be corrugated board. They are delivered set-up, exteriorly unglued, and registered above the outer box blank 56.

The portions 74, 65 and 58 respectively of the wrap 57, blank 56 and inner box 55 that are to form the bottom of the composite box are registered together.

The bottom portion 65 of the open blank 56 of the outer shell may be registered upon the glued surface 74 of the wrap, and the inner box 55 is then registered upon the stencil-glued upper surface of the blank 56.

The inner box 55 carrying the blank 56 for the outer shell upon its bottom and the wrap 57 upon the bottom of the blank 56 may then be assembled into the finished box, either by hand operation, or better, by the use of any one of a number of different wrapping machines of the prior art, modified as to minor details.

The assembly is preferably accomplished by aligning the inside of the bottom 65 of the outer shell 56 against the outside of the bottom 58 of the inner shell 55, desirably gluing the bottoms of the outer and inner shells together. The end flaps 66 of the outer shell are then folded upon their score lines 68 and glued to the ends 59 and 60 of the inner shell, and the side flaps 67 of the outer shell are folded upon their score lines 69 and glued to the sides 61 and 62 of the inner shell.

The side turn-in extensions 70 on the end flaps 66 are folded on their score lines (either before or after folding up the side flaps 67) and glued to the sides 62 and 62 of the inner shell 56, bringing the edges 72 and 73 of the outer shell blank into abutting position. The portions 70' of the turn-in extensions 70 now cover the upper parts of the ends of the drop lid ends of the inner shell 55.

The cover 74 is next applied, folding up the end flaps 74' and the side flaps 74² in any suitable manner, well known in the art.

The inner shell may be wrapped without the outer shell as shown in Figures 11 and 12.

While it is desirable to apply the wrap and outer shell simultaneously to the box this is not essential and the inner shell and outer shell may be combined without an outer wrap. This is sometimes worth while since the different box manufacturers do not all use the same wraps.

Figure 6 shows the assembly when the outer shell is set up from a conventional cruciform blank.

In this event the cruciform wrap is preferably provided with upwardly glued corner stays at 75 as by mechanism of the prior art, for example by means of a Stokes & Smith gluing machine with a tabbing attachment which fits the four corner stays on to the wrap in glued condition. Such a machine is described in U. S. Patent No. 1,806,181, issued to E. G. Rider.

As before the top of the wrap is glued. The cruciform blank 56' for the outer shell, stencil glued on its upper side, is registered upon the wrap 57' and the unglued inner shell 55' is registered on top of the outer shell 56'.

It will be understood that the cruciform outer box, in flat condition, may be stencil glued on its upper side in an ordinary stencil gluing machine, after which it may be spotted or registered on the upper glued face of the wrap and on top of the stays 75 which may suitably comprise kraft paper tape of the prior art. The inner box is next placed upon the flat stencil-glued outer box wrap and the three assembled members applied to the form of a wrapping machine which may include the clip mechanism for holding the end flaps to position but obviously need not include the side turn-in mechanism already described.

The finished box is of the form shown in Figure 2a already described as is also the form having side turn-in flaps across the ends of turn-in ends of the inner box.

The score lines where the flaps turn up in the corners may be skived as indicated at 78', Figures 7 and 9.

While it is usually more desirable to make the front or back as a single unit adapted to take nails or to hold the lid at any point along its length, it will be understood that surface may be provided merely at the point or points that are to receive the nail or nails.

In Figures 11 and 12 a portion 79 of the front flap is made integral with the bottom of the box and therefore with the ends and back. A relatively narrow strip of dense board, suitably wood, is provided at 80 above the lower portion of the front.

In Figures 11 and 12 the wooden strip extends the length of the front. As in many cases the front has to hold but a single nail, the dense board portion may include an insert at the receiving point of the front, as indicated at 81 in Figures 13 and 14. More usually, the composite portion of the inner box will include the bottom, ends and back only, set-up about suitable crushed or skived score lines and assembled with a "wood" front.

In some circumstances it may be preferable to make both front and rear sides of dense board. This is particularly desirable for boxes that have unhinged lids, as both sides of the lids may then be nailed to sides intermediate the drop lid ends, or when particularly rigid boxes are desired.

The setting up of the inner shell may be made in any suitable way, and is perhaps most conveniently made on a modified quadruple staying machine, such for example as that described in U. S. Patents Nos. 728,806 and 1,383,697. The corrugated sheets are cut to size on any suitable cutting machine, then scored along the folding lines, as by skiving or crushing. The corners are then cut out as by means of a box corner cutter on a 90° angle.

In setting up, assuming the mechanism of the quadruple staying machine described in the above patents, the dense board or solid side of the box is applied to the box form 82 while the form is in its uppermost position, a suitable magazine 83 forming part of the present invention, being provided to feed the box sides 62 successively against the side of the form when the form is in its high position, (Figures 17 and 18).

The side 62 delivered to the form 82 is held to place in any way, most conveniently by suction as applied to the interior of the form at the connection 84.

The corrugated pieces 85 with the three extending wings or flaps may be fed from a stack in the usual way. A front 62 is thus placed on the front of the block 82 while a corrugated piece 85 for the bottom, ends and back, is registered as usual below the form, lying flat.

The form or block 82 descends, carrying with it the front 62, held to it by suction or otherwise. It meets and sets up the blank 85, the ends and back of the blank folding up over the corresponding ends and back of the form as the form travels downward between suitable guides 86.

The guides 86 hold the blank 85 in set-up position, and, during the downward movement, the stays 64 may be applied along the four corners in the usual way for this type of machine.

When the form 82 retracts upwardly it leaves the set-up box 87 as the top box of a pile held resiliently in a guideway 88 (Figure 18) normally part of the machine.

Each newly set-up box downwardly progresses the pile the height of one box, delivering the bottom box of the pile from the guideway.

The form 82 receives another solid front 62, or a back, or both, each time it is at its uppermost position, while, simultaneously therewith, a second blank 85 may be placed as before below the form.

Each downward stroke of the form completes a set-up box into the guideway beneath the form and causes the bottom box of the pile to drop out at a point where it may be received by a suitable conveyor, the guideway holding the boxes in set-up position until sufficient time has elapsed for the adhesive on the stays applied to the box on the downward stroke of the form to set sufficiently for permanent holding.

It will be understood that the machine is normally equipped for appliances for putting on the corner stays 64, suitably kraft paper, to the outside of the boxes, and that the application of these stays therefore is not part of the present invention.

The tape forming the stays 64 is cut off after it has been applied to the corners of the box and the box then continues on downward through the guideway with the walls of the guide fitting the outside of the box and holding the walls in set-up position.

New features added to this machine include the mechanism for applying the front 62 to the side of the form 82 and for holding the applied fronts to place against the form during the set-up operations, as well as broadly the method of using the old mechanism which consists in applying different portions of the box to the form at different vertical positions thereof.

The inner box, when discharged from the staying machine, is ready either to have a wrap applied directly to it, the finished box then having but a single shell with an outside wrap, or it is ready to have an outer shell applied to the inner shell as already described, preferably with the simultaneous application of the outside wrap.

If the inner box is to be used alone, stays may be applied to the inside corners. The inner box may be lined while still in the flat stage or optionally the board from which the inner box is made up may be lined in large sheets before the board is cut to size. In this event the front would usually have to be lined also.

It is thought preferable to postpone or delay the lining until the box has been wrapped and then to apply a cruciform shaped lining in any suitable and known manner such as described in the Kleinsmith U. S. Patent No. 1,810,171, granted May 23, 1933 for "Box Lining Machine".

It will be evident that in the assemblage of the parts, the bottom of the inner shell and outer shell and the wrap must be registered and united first and that the inner shells may most conveniently be formed up separately before they are united to the outer shells and the latter united to the wraps.

It will further be evident that, after the folding up of the ends of the outer shell, the operation of wrapping in the Figure 6 form, for example, can be performed as a normal machine box wrapping operation by a wrapping machine of the character of that shown in the Kleinsmith et al. U. S. Patent No. 1,733,229, since the long sides of the outer shell may be turned up simultaneously with and because of the turning up of the long sides of the wraps.

It is also clear that, in the Figure 5 form, after the ends of the outer shell have been turned up and united with the inner shell and the extension sides of the ends have been united to the long sides of the inner shell, the operation can be completed as a normal box wrapping operation for the same reason that the long sides of the outer shell can then be wrapped up along with the long sides of the wrap. The lateral extensions of the ends of the outer shell perform a drop lid cover function in addition to their corner reinforcement function, which drop lid cover function would be performed even if the lower parts of those extensions were omitted.

Outer stays such as are shown in Figures 5 and 6 with or without inner stays, such as are shown in Figure 4b, are particularly advantageous in holding the inner shell together during the operation and permanently thereafter and because the stays can be applied by standard staying machines.

It will be evident that the inner and preferably heavier shell of my composite box is made of corrugated board which presents an open face at its edges (such as the ends and top of the drop lid ends), and a closed face at its sides (such as the drop lid ends, and bottom of the box). The outer and preferably lighter shell, desirably made of solid cardboard as distinguished from corrugated board, may be used to cover the open faces as well as the closed faces of the corrugated board (inner shell), and stay the corners, as shown in Figure 5, for example.

In view of my invention and disclosure variations and modifications to meet individual whim or particular need will doubtless become evident to others skilled in the art, to obtain all or part of the benefits of my invention without copying the structure shown, and I, therefore, claim all such in so far as they fall within the reasonable spirit and scope of my invention.

Having thus described my invention, what I claim as new and desire to secure by Letters Patent is:

1. The method of forming a composite box having a nail-receiving insert for the front of the box initially separate from the rest of the box, which consists in holding the nail-receiving insert in a position at right angles to the bottom of the box and above the edge of the bottom of the box into which the insert is to fit, in moving the insert down into the position it is to occupy with respect to the bottom of the box and folding up the ends and back of the box and in uniting together the front, the back and the ends of the box.

2. A box machine for setting up and corner-staying a two-piece box blank and including a vertically movable form, means for registering one of the pieces against a side of the form while the form is in raised position, for registering the other piece vertically beneath the form and suction means for holding the first piece against the form while concurrently moving the form downward for the setting-up of the second piece.

F. RODGERS NEELY.